(12) United States Patent
Hyndman et al.

(10) Patent No.: US 9,176,579 B2
(45) Date of Patent: Nov. 3, 2015

(54) VISUAL INDICATION OF USER INTERESTS IN A COMPUTER-GENERATED VIRTUAL ENVIRONMENT

(75) Inventors: Arn Hyndman, Ottawa (CA); Nicholas Sauriol, Ottawa (CA)

(73) Assignee: AVAYA INC., Basking Ridge, NJ (US)

( * ) Notice: Subject to any disclaimer, the term of this patent is extended or adjusted under 35 U.S.C. 154(b) by 1063 days.

(21) Appl. No.: 12/345,376

(22) Filed: Dec. 29, 2008

(65) Prior Publication Data

US 2010/0169798 A1 Jul. 1, 2010

(51) Int. Cl.
| | |
|---|---|
| G06F 3/048 | (2013.01) |
| G06F 3/01 | (2006.01) |
| A63F 13/30 | (2014.01) |
| G06F 3/0481 | (2013.01) |

(52) U.S. Cl.
CPC ............... *G06F 3/011* (2013.01); *A63F 13/12* (2013.01); *G06F 3/04817* (2013.01); *A63F 2300/305* (2013.01); *A63F 2300/5546* (2013.01); *A63F 2300/5553* (2013.01)

(58) Field of Classification Search
CPC ...... G06F 3/04815; G06T 19/00; H04L 7/157
USPC .......................... 715/757, 848, 849, 850, 852
See application file for complete search history.

(56) References Cited

U.S. PATENT DOCUMENTS

| | | | |
|---|---|---|---|
| 6,910,186 B2 | 6/2005 | Kim | |
| 7,342,587 B2 * | 3/2008 | Danzig et al. | 345/473 |
| 2008/0091692 A1 * | 4/2008 | Keith et al. | 707/100 |
| 2008/0262911 A1 | 10/2008 | Altberg | |
| 2008/0263460 A1 * | 10/2008 | Altberg et al. | 715/757 |
| 2008/0287190 A1 * | 11/2008 | Fulton et al. | 463/42 |
| 2009/0037822 A1 * | 2/2009 | Kandekar et al. | 715/733 |
| 2009/0119605 A1 * | 5/2009 | Bokor et al. | 715/757 |
| 2009/0158170 A1 * | 6/2009 | Narayanan et al. | 715/753 |
| 2010/0156909 A1 * | 6/2010 | Banerjee et al. | 345/469.1 |
| 2010/0233667 A1 * | 9/2010 | Wilson et al. | 434/362 |

FOREIGN PATENT DOCUMENTS

| | | |
|---|---|---|
| WO | WO2008/125593 | 10/2008 |
| WO | WO2008/132240 | 11/2008 |
| WO | WO2008/141256 | 11/2008 |

OTHER PUBLICATIONS

Written Opinion of the International Searching Authority from corresponding PCT application PCT/CA2009/000376.

* cited by examiner

*Primary Examiner* — Rashawn Tillery
(74) *Attorney, Agent, or Firm* — Anderson Gorecki & Rouille LLP (57) ABSTRACT

Users create profiles containing their interests, professional qualifications, and/or personal information. When users encounter each other in the virtual environment, the information contained in the personal profiles is used to provide visual indications of the profile information so that other users know some modicum of information about the user associated with the Avatar. The user associated with the personal profile may control what information is provided publicly and what information is provided privately. Information in other users' profiles may be filtered to enable relevant information to be presented to the user. Filtering may be explicit and based on user-defined criteria. Filtering may be inherent as well and implemented to select visual indications based on similarities between the user's profile information and the other users' profile information. Inherent matching of attributes may be exact, based on pre-defined similarities or groups, or based on learned similarities between types of attributes, or based on previous interactions of the user with other users in the virtual environment.

16 Claims, 7 Drawing Sheets

| | | |
|---|---|---|
| Fishing | Golf | Company Logo |
| Backpacking | Tennis | Management |
| Hiking | Horseback riding | Telecommunications |
| Camping | Snomobiling | Software programmer |
| Canoeing | Ice Skating | Database engineer |
| Kayaking | Cross country skiing | Seeking new Job |
| Swimming | Downhill skiing | Note |
| Diving | Socializing | Male |
| Rock Climbing | Movies | Female |

VISUAL INDICATION OF USER INTERESTS IN A COMPUTER-GENERATED VIRTUAL ENVIRONMENT

CROSS-REFERENCE TO RELATED APPLICATIONS

None

BACKGROUND OF THE INVENTION

1. Field of the Invention

The present invention relates to virtual environments and, more particularly, to a method and apparatus for providing a visual indication of profile attributes in a computer-generated virtual environment.

2. Description of the Related Art

Virtual environments simulate actual or fantasy 3-D environments and allow for many participants to interact with each other and with constructs in the environment via remotely-located clients. One context in which a virtual environment may be used is in connection with gaming, although other uses for virtual environments are also being developed.

In a virtual environment, an actual or fantasy universe is simulated within a computer processor/memory. Multiple people may participate in the virtual environment through a computer network, such as a local area network or a wide area network such as the Internet. Each player selects an "Avatar" which is often a three-dimensional representation of a person or other object to represent them in the virtual environment. Participants send commands to a virtual environment server that controls the virtual environment to cause their Avatars to move within the virtual environment. In this way, the participants are able to cause their Avatars to interact with other Avatars and other objects in the virtual environment.

A virtual environment often takes the form of a virtual-reality three dimensional map, and may include rooms, outdoor areas, and other representations of environments commonly experienced in the physical world. The virtual environment may also include multiple objects, people, animals, robots, Avatars, robot Avatars, spatial elements, and objects/environments that allow Avatars to participate in activities. Participants establish a presence in the virtual environment via a virtual environment client on their computer, through which they can create an Avatar and then cause the Avatar to "live" within the virtual environment.

As the Avatar moves within the virtual environment, the view experienced by the Avatar changes according to where the Avatar is located within the virtual environment. The views may be displayed to the participant so that the participant controlling the Avatar may see what the Avatar is seeing. Additionally, many virtual environments enable the participant to toggle to a different point of view, such as from a vantage point outside of the Avatar, to see where the Avatar is in the virtual environment.

The participant may control the Avatar using conventional input devices, such as a computer mouse and keyboard. The inputs are sent to the virtual environment client which forwards the commands to one or more virtual environment servers that are controlling the virtual environment and providing a representation of the virtual environment to the participant via a display associated with the participant's computer.

Depending on how the virtual environment is set up, an Avatar may be able to observe the environment and optionally also interact with other Avatars, modeled objects within the virtual environment, robotic objects within the virtual environment, or the environment itself (i.e. an Avatar may be allowed to go for a swim in a lake or river in the virtual environment). In these cases, client control input may be permitted to cause changes in the modeled objects, such as moving other objects, opening doors, and so forth, which optionally may then be experienced by other Avatars within the virtual environment.

"Interaction" by an Avatar with another modeled object in a virtual environment means that the virtual environment server simulates an interaction in the modeled environment, in response to receiving client control input for the Avatar. Interactions by one Avatar with any other Avatar, object, the environment or automated or robotic Avatars may, in some cases, result in outcomes that may affect or otherwise be observed or experienced by other Avatars, objects, the environment, and automated or robotic Avatars within the virtual environment.

A virtual environment may be created for the user, but more commonly the virtual environment may be persistent, in which it continues to exist and be supported by the virtual environment server even when the user is not interacting with the virtual environment. Thus, where there is more than one user of a virtual environment, the environment may continue to evolve when a user is not logged in, such that the next time the user enters the virtual environment it may be changed from what it looked like the previous time.

Virtual environments are commonly used in on-line gaming, such as for example in online role playing games where users assume the role of a character and take control over most of that character's actions. In addition to games, virtual environments are also being used to simulate real life environments to provide an interface for users that will enable on-line education, training, shopping, and other types of interactions between groups of users and between businesses and users.

As Avatars encounter other Avatars within the virtual environment, the participants represented by the Avatars may elect to communicate with each other. For example, the participants may communicate with each other by typing messages to each other or an audio bridge may be established to enable the participants to talk with each other.

Unfortunately, although many virtual environments are used by large numbers of people, it is often difficult to find other users within the virtual environment. Thus, the virtual environment may seem empty, even though there are many people using the virtual environment at the same time. Additionally, when Avatars meet in the virtual environment they will often have no idea who the other person is or what their interests may be. In a virtual environment hosted on the Internet, for example, the users may reside thousands of miles apart, in different countries, and have in vastly different day-to-day experiences. In a more focused virtual environment, such as a virtual environment designed to host a conference or trade show, the participants may be expected to have a common interest in the topic of the show. However, the users may have other interests in common with each other as well, and those other personal interests will be unknown. This is a common problem in real-life networking, where two people in a room full of people may have common interests, but need to be able to find each other and have a sufficiently in-depth conversation to enable the common interest to emerge. In an on-line context, this may be more difficult to accomplish, since the users cannot actually see each other and thus may have less possibility to pick up on visual clues.

SUMMARY OF THE INVENTION

A method and apparatus for providing a visual indication of profile attributes (such as user interests, location, employment, etc.) in a computer-generated virtual environment enables users to create profiles containing their interests, professional qualifications, and/or personal information. When users encounter each other in the virtual environment, the information contained in the personal profiles may be used to provide visual indications of the profile attributes so that other users know some modicum of information about the user associated with the Avatar. The visual indications may be implemented as interest icons or bits of text.

The user associated with the personal profile may control what information is provided publicly and what information is provided privately. Similarly, information in other users' profiles may be filtered to enable relevant information to be presented to the user. Filtering may be explicit and based on user-defined criteria so that the user can filter information shown to him to highlight Avatars with particular profile attributes. Filtering may be inherent as well and implemented to select visual indications based on similarities between the user's profile information and the other user's profile information. Inherent matching of attributes may be exact, based on pre-defined similarities or groups, or based on learned similarities between types of attributes, or based on previous interactions of the user with other users in the virtual environment. Optionally, a map may show the location and/or density of Avatars representing users with particular interests or traits.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
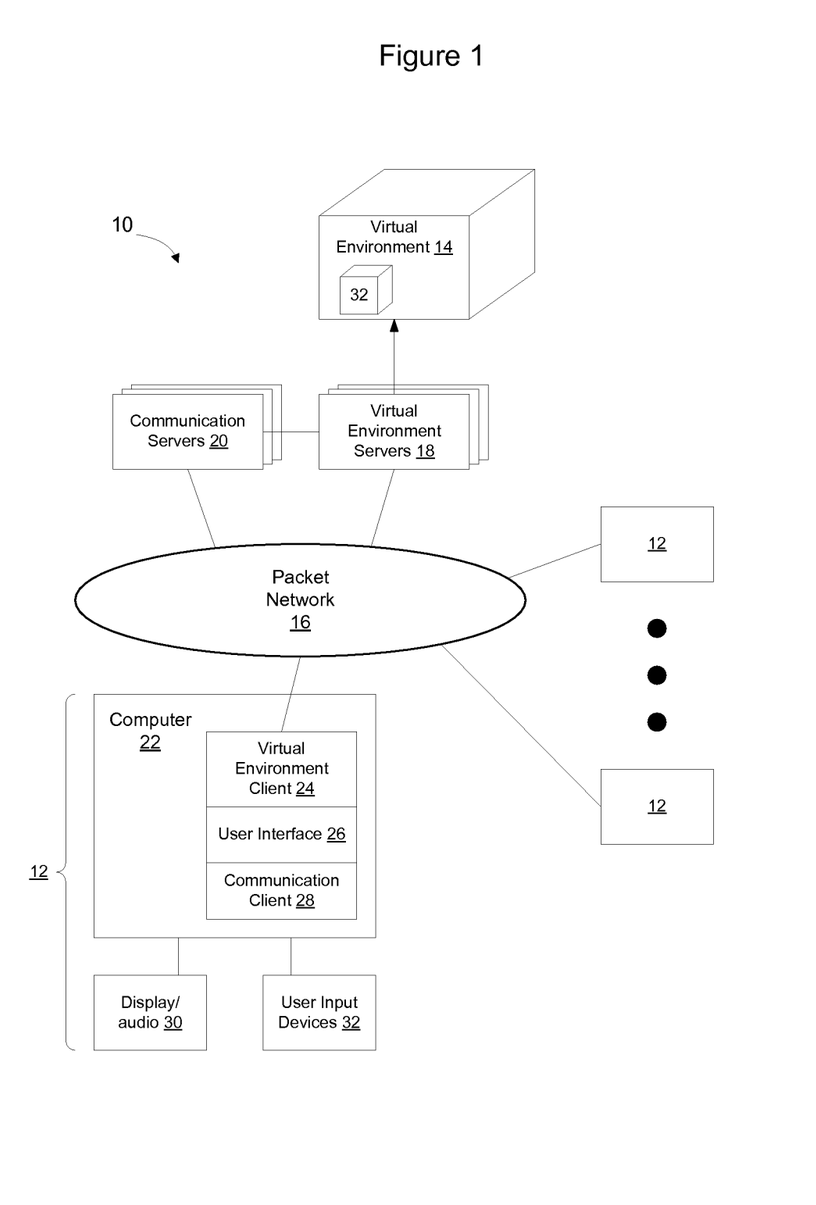
FIG. 1 is a functional block diagram of a portion of an example system enabling users to have access to three dimensional computer-generated virtual environment.

FIG. 1 shows a portion of an example system 10 showing the interaction between a plurality of users 12 and one or more virtual environments 14. A user may access the virtual environment 14 from their computer 22 over a packet network 16 or other common communication infrastructure. The virtual environment 14 is implemented by one or more virtual environment servers 18. Communication sessions between the users 12 may be implemented by one or more communication servers 20.

The virtual environment may be implemented as using one or more instances, each of which may be hosted by one or more virtual environment servers. Where there are multiple instances, the Avatars in one instance are generally unaware of Avatars in the other instance. Conventionally, each instance of the virtual environment may be referred to as a separate World. In the following description, it will be assumed that the Avatars are instantiated in the same world and hence can see each other and communicate with each other. A world may be implemented by one virtual environment server 18, or may be implemented by multiple virtual environment servers. Although an embodiment has been described in which interest matching has been implemented within a particular world, the same type of interest matching may also be used across worlds to help a user select which world to log into. This may enable the user to find worlds with higher concentrations of users with particular interests or attributes before entering into the world.

The virtual environment 14 may be any type of virtual environment, such as a virtual environment created for an on-line game, a virtual environment created to implement an on-line store, a virtual environment created to implement an on-line training facility, or for any other purpose. Virtual environments are being created for many reasons, and may be designed to enable user interaction to achieve a particular purpose. Example uses of virtual environments include gaming, business, retail, training, social networking, and many other aspects.

Generally, a virtual environment will have its own distinct three dimensional coordinate space. Avatars representing users may move within the three dimensional coordinate space and interact with objects and other Avatars within the three dimensional coordinate space. The virtual environment servers maintain the virtual environment and generate a visual presentation for each user based on the location of the user's Avatar within the virtual environment. The view may also depend on the direction in which the Avatar is facing and the selected viewing option, such as whether the user has opted to have the view appear as if the user was looking through the eyes of the Avatar, or whether the user has opted to pan back from the Avatar to see a three dimensional view of where the Avatar is located and what the Avatar is doing in the three dimensional computer-generated virtual environment. As discussed in greater detail below, the view presented to a user may include interest icons that enable the user to see a visual representation of the interests of the other users represented by the visible Avatars.

Each user 12 has a computer 22 that may be used to access the three-dimensional computer-generated virtual environment. The computer 22 will run a virtual environment client 24 and a user interface 26 to the virtual environment. The user interface 26 may be part of the virtual environment client 24 or implemented as a separate process. A separate virtual environment client may be required for each virtual environment that the user would like to access, although a particular virtual environment client may be designed to interface with multiple virtual environment servers. A communication client 28 is provided to enable the user to communicate with other users who are also participating in the three dimensional computer-generated virtual environment. The communication client may be part of the virtual environment client 24, the user interface 26, or may be a separate process running on the computer 22.

The user may see a representation of a portion of the three dimensional computer-generated virtual environment on a display/audio 30 and input commands via a user input device 32 such as a mouse, touch pad, or keyboard. The display/audio 30 may be used by the user to transmit/receive audio information while engaged in the virtual environment. For example, the display/audio 30 may be a display screen having a speaker and a microphone. The user interface generates the output shown on the display under the control of the virtual environment client, and receives the input from the user and passes the user input to the virtual environment client. The virtual environment client passes the user input to the virtual environment server which causes the user's Avatar 34 or other object under the control of the user to execute the desired action in the virtual environment. In this way the user may control a portion of the virtual environment, such as the person's Avatar or other objects in contact with the Avatar, to change the virtual environment for the other users of the virtual environment.

Typically, an Avatar is a three dimensional rendering of a person or other creature that represents the user in the virtual environment. The user selects the way that their Avatar looks when creating a profile for the virtual environment and then can control the movement of the Avatar in the virtual environment such as by causing the Avatar to walk, run, wave, talk, or make other similar movements. Thus, the block 34 representing the Avatar in the virtual environment 14, is not intended to show how an Avatar would be expected to appear in a virtual environment. Rather, the actual appearance of the Avatar is immaterial since the actual appearance of each user's Avatar may be expected to be somewhat different and customized according to the preferences of that user. Since the actual appearance of the Avatars in the three dimensional computer-generated virtual environment is not important to the concepts discussed herein, Avatars have generally been represented herein using simple geometric shapes or two dimensional drawings, rather than complex three dimensional shapes such as people and animals.

Figure 2:
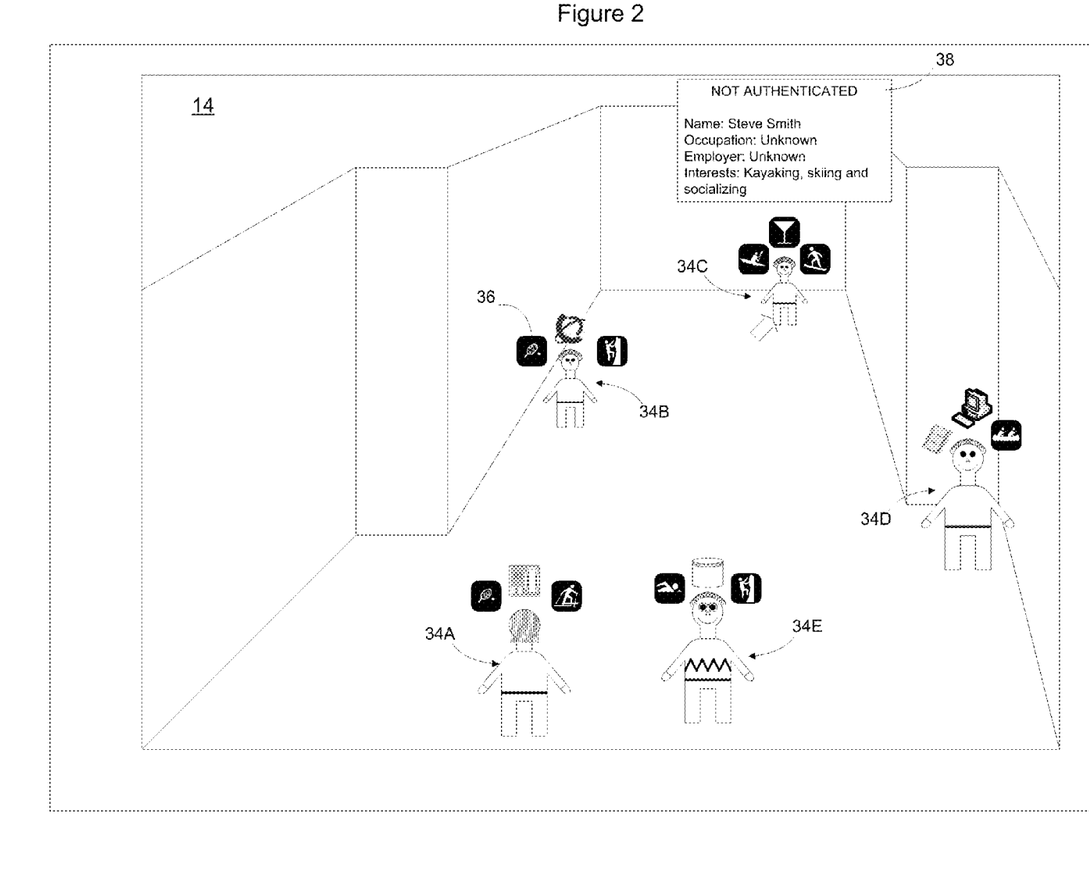
FIGS. 2-4 show examples of a computer-generated virtual environment through which a visual indication of user interests may be provided according to an embodiment of the invention according to embodiments of the invention.

FIG. 2 shows a portion of an example three dimensional computer-generated virtual environment and showing some of the features of the visual presentation that may be provided to a user of the virtual environment to show the interests of users associated with other Avatars according to an embodiment of the invention. As shown in FIG. 2, Avatars 34 may be present and move around in the virtual environment. It will be assumed for purposes of discussion that the user of the virtual environment in this Figure is represented by Avatar 34A. In FIG. 2, Avatar 34A is facing away from the user and looking into the three dimensional virtual environment.

In the embodiment shown in FIG. 2, the user associated with Avatar 34A can see Avatars associated with multiple other users of the virtual environment. To enable the user to know who the Avatars are and what their interests are, the virtual environment server will generate interest icons 36 for the users and associate the interest icons with the users' Avatars. As used herein, the term "interest icon" will include both pictures and small bits of text. The interest icons may be always present, may appear when the user mouses over the other Avatar, may be positionally dependent and appear to the user only when the user's Avatar is sufficiently close to the other Avatar, or may be caused to appear in a different manner. A name icon may also be provided for the other Avatars if desired.

Figure 6:
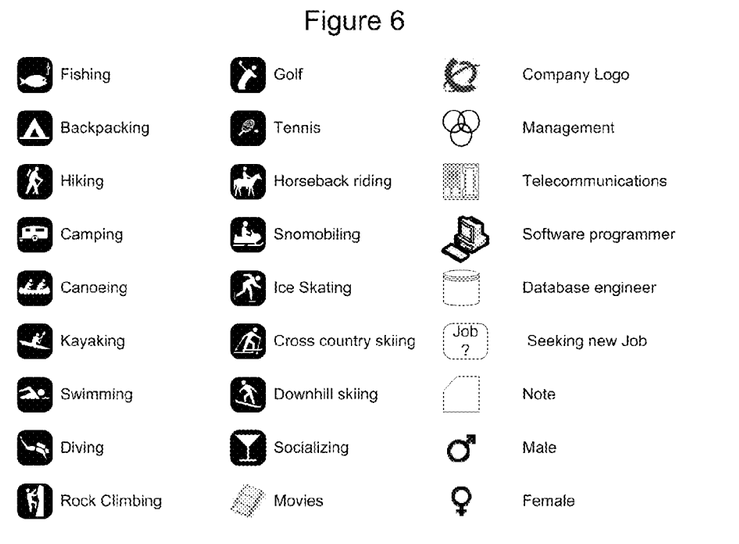
FIG. 6 shows an example selection of icons that may be used as visual indicators to provide a visual indication of user interests in a computer-generated virtual environment.

Selection of the particular interest icons may be implemented in many different ways. For example, in the example shown in FIG. 2, the users have selected icons to be shown to other users of the virtual environment. In this example, Avatar 34A has selected to show that he is interested in tennis, cross-country skiing, and is in the telecommunications field. Avatar 34B, has elected to show interest icons to let other users know that he she is interested in tennis, and rock climbing, and that she works for Nortel Networks. A selection of icons and their legends is shown in FIG. 6, although the invention is not limited to the use of any particular icons as the visual indicators.

By allowing the users to put things in their profile that get displayed to other users of the virtual environment, and also optionally allowing the user to select which icons should be associated with their Avatar, the users are allowed to advertise their interests within the computer generated virtual environment. This allows the users to present a self image to other users of the virtual environment, so that the users can learn a bit about the user to facilitate conversation and allow the users to find fellow users with similar interests. For example, the user associated with Avatar 34A may scan the icons of the other users to determine that he has an interest in tennis in common with the user associated with Avatar 34B, a possible common snowsports interest (skiing/skiboarding) in common with Avatar 34C, and nothing immediately apparently in common with the users associated with Avatars 34D and 34E. If the user elects to talk with one of the users on a communication session, the knowledge of the users' other interests may help the user bring up the topic of interest to both users, which may potentially start a conversation related to that topic.

A user may include many interests in their user interest profile. For example, the user may include band logos, product logos, sports team affiliation information, and many other types of information.

In the example shown in FIG. 2, the user may obtain additional information about the user by mousing over the user. The term "mousing over" will be used to refer to taking a pointer cursor and causing the pointer cursor to hover on or in the vicinity of the other Avatar. Commonly, the pointer cursor is controlled using a computer mouse, although a touch pad, track ball, control stick, pointing stick found in some laptop keyboards, or other devices may also be used to control the pointer cursor on the display. In the example shown in FIG. 2, when the user mouses over an Avatar, a badge 38 appears above the Avatar.

In a non-business related situation, the badge may contain information about the user such as the user's name, their occupation, other biographical information, their interests, and other similar information. The user may be authenticated or not authenticated, depending on how the user entered the virtual environment. The authentication state will be noted on the badge 38 to enable the user to have context for the likely reliability of the information contained in the badge. For example, the user associated with the badge may have been required to provide proof of age and identity, such as by providing credit card information, when establishing an account profile. As part of the process of establishing an account, the user may have been assigned a user name and password that the user can use to enter the virtual environment. If the user logs into the virtual environment through a formal login-process using the established name/password, the user may be authenticated to the virtual environment server, which may allow the virtual environment server to provide an indication of authenticity to the other users of the virtual environment. Where the user logs in as a guest or otherwise does not have to submit proof of identity in connection with establishing a profile, however the virtual environment server may indicate that the information associated with the user that is being displayed is unauthenticated and not independently verifiable by the virtual environment server.

Figure 3:
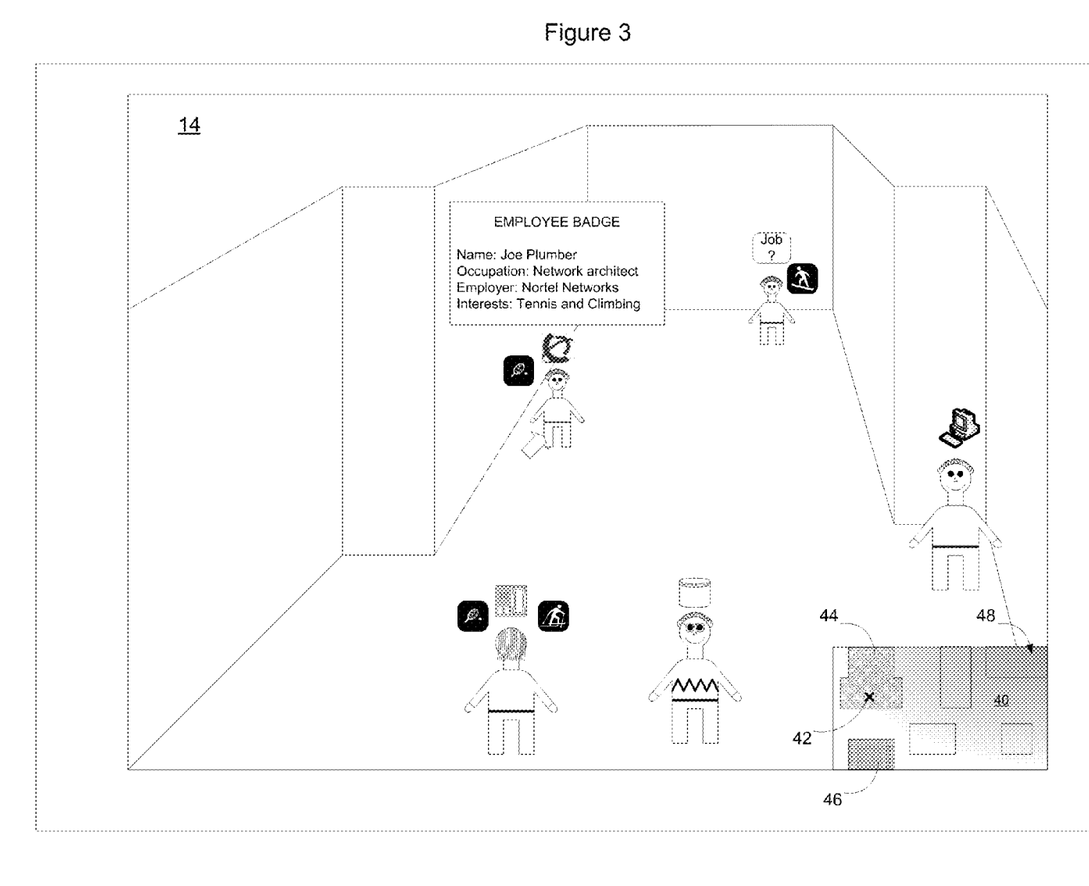

In a business setting, the badge may be a company badge such as a representation of a company ID badge which many companies require employees to wear while at work (see FIG. 3). The badge may indicate which company the user works for, their position within the company, whether the user has authenticated to the company network or the virtual environment server, and other information. For example, users of a company network may log onto the company network and be authenticated via an authentication server. After logging in, the user may access the company's virtual environment on the network and work within the virtual environment. The authentication process may be used to determine the user's authorization level, which may be used to lock/unlock particular areas of the virtual environment or otherwise control where the employee is allowed to go within the company's virtual environment. The badge 38 may allow other employees of the company to determine which fellow employee is associated with a particular Avatar and learn of the user's position within the company. Other information about the employee may be provided as well as dictated by the user or by company policy.

FIG. 2 shows an unauthenticated badge and FIG. 3 shows an authenticated badge. As shown by comparing these two figures, the authentication indication may be explicit to make it apparent as to which users are authenticated and which are not. The authentication indication may be textual or the color, transparency, design, or other form of the badge may be adjusted to differentiate between authenticated and unauthenticated users. The authentication indication may be used by itself or in connection with other information to provide an indication of the user interests in the computer generated virtual environment.

As mentioned above, FIG. 2 shows an example where each user selects which interest indicators are shown to the other users of the virtual environment. Users may access their profile (see FIG. 7) to select particular icons for display depending on the virtual environment setting and situation. In this embodiment, each user will see the same set of icons for each Avatar.

FIG. 3 shows another example in which the virtual environment server selects the interest icons to be displayed on a user specific basis. Thus, each user of the virtual environment may see a different set of interest icons for a particular Avatar. In this embodiment, the virtual environment server will compare the user's profile with user profiles and look to see what commonalities there are. Where two users have an interest in common, the virtual environment server will generate an interest icon and associate the interest icon with the user in the virtual environment. Since the interest icons are being selected for a particular user based in part on that user's profile, the interest icons that appear on Avatars within the virtual environment will be different for each user such that each user is shown a customized set of icons based on what the Avatars have in common with that user.

In the embodiment shown in FIG. 3, the user associated with Avatar 34A has a common interest in tennis with the user associated with 34B, and a common interest in snowsports with the user associated with Avatar 34C. Thus, the user associated with Avatar 34A has been provided with the illustrated interest icons. The user associated with Avatar 34D may see the same virtual environment and the same Avatars within the virtual environment. If the user associated with Avatar 34D is not interested in tennis and snowsports, however, those interest indicators would not be shown to the user associated with Avatar 34D.

In the embodiment shown in FIG. 3, the user may influence the types of interest indicators that are shown in the virtual environment. For example, the user may want to know who the other users work for, for business networking purposes. Accordingly, the user may instruct the virtual environment server/client to generate occupation icons for each of the users and associated the occupation interest icons with each of the users' Avatars. The user may elect other types of interest icons to always be provided as well. Accordingly, as shown in FIG. 3, the user may be provided with an ability to select which types of interest icons should be provided so that the user is provided with information about the other users that the user feels is personally relevant.

The user may control thus specify how information in other users' profiles should be filtered to enable relevant information to be presented to the user. Filtering may be explicit and based on user-defined criteria so that the user can filter information shown to him to highlight Avatars with particular profile attributes. Filtering may be inherent as well and implemented to select visual indications based on similarities between the user's profile information and the other user's profile information. Inherent matching of attributes may be exact, based on pre-defined similarities or groups, or based on learned similarities between types of attributes, or based on previous interactions of the user with other users in the virtual environment.

Within a virtual environment, it may be difficult to find other users that have similar interests. For example, if there are 1000 users of the virtual environment which may have some interests in common with a particular user, the user may have to waste significant time maneuvering in the virtual environment to see one or more other users with similar interests. To solve this problem, according to an embodiment of the invention, a map is provided which has a gray-scale indication showing the level of commonality of interest between the user of the virtual environment and other users of the virtual environment. A region with a larger number of Avatars that have users with interests that are similar to the user's interests will be colored darker, while a region with fewer similarly interested users will be colored lighter. The map may help guide the user toward particular regions of the virtual environment to enable the user to find a higher concentration of other users that may have similar interests.

For example, as shown in FIG. 3, the map 40 may contain a two dimensional plan view representation of the larger virtual environment and show the location 42 of the user in the virtual environment. The user is currently in a room 44 which has several Avatars representing users with common interests. Hence, the room 44 has been colored partially. By looking at the map, the user may see that there is another room 46 that is somewhat darker in color directly behind them, so it is likely that the user will find several Avatars in that room that have users with similar interests. The user may also look at the map and see that it appears that there is a larger concentration of similarly interested users in the upper right-hand corner 48. The user may thus infer that, by heading in that direction, the user would be likely to encounter larger numbers of Avatars that have users with interests that are similar to the user. The map may be shaded as a whole, may be divided into quadrants or in another manner, colored room by room, or otherwise as desired. Where the map has multiple levels, the multiple levels may be accessible by clicking on the map or otherwise manipulating controls to show different levels within the virtual environment.

Figure 4:
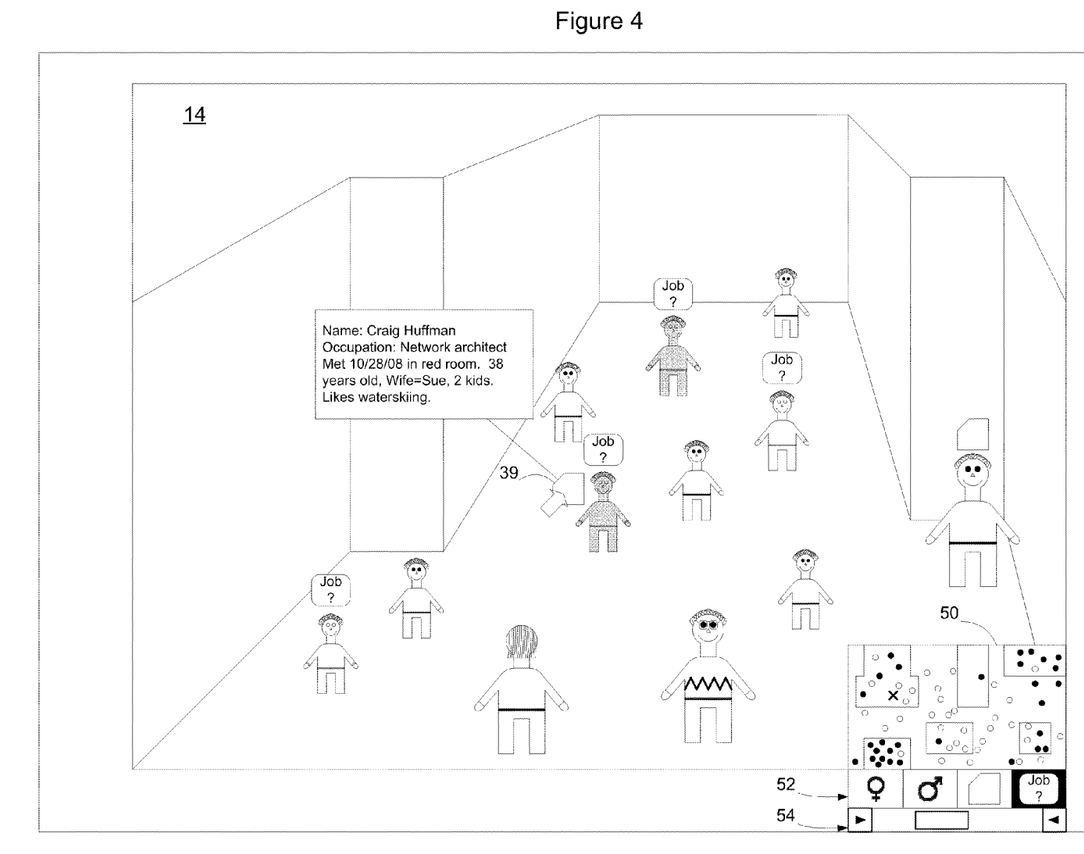

FIG. 4 shows another example that may be used to provide visual indication of user interests in a computer-generated virtual environment. This example is similar to the example shown in FIG. 3, in that the user is allowed to specify the type of information that the user would like to know about each of the other users. However, in this example the user has been provided with the opportunity to select one specific aspect to be highlighted. Specifically, in the example shown in FIG. 4, the user has elected to have the virtual environment server highlight those users that are currently looking for a job. The virtual environment server has thus filtered user profiles to determine which users are currently unemployed or who would be willing to move to a new job as indicated by their profile. To provide this information to the user, an interest indicator has been associated with each of the Avatars that falls into this category.

Additionally, in the example shown in FIG. 4, the virtual environment server has colored each of the Avatars a different color or otherwise altered the appearance of the Avatars within the virtual environment, if those Avatars have a similar educational background and experience background to the user. This helps the more relevant Avatars stand out among a crowd of Avatars and enables the user to preferentially talk to selected users that are more likely to have relevant experience.

The example shown in FIG. 4 also shows another feature that may be used by the user to remember details about the users. Specifically, as shown in FIG. 4, as the user encounters other users in the virtual environment, the user may make notes about those users. Whenever a user makes a note on a particular user, the note will be associated with the user in the virtual environment and a note icon 39 will be shown adjacent the Avatar. Notes may be public or, preferentially, may be private such that they are only available and visible to the person that made the note. When the user is in the virtual environment at a later time and encounters the same Avatar, if the user has made notes about the other user, the virtual environment server or virtual environment client will generate a note icon next to or above the other user's Avatar. The user may retrieve the notes by mousing over the note icon to quickly recall the information about the other user. This enables the user to write relevant information about the users within the virtual environment and have the information readily available at a subsequent time.

When a user makes a note about an Avatar, that note may be stored in the user's profile or on the user's computer so that it may be recalled when the user later encounters the same Avatar. The note may be linked to the other user's ID so that, when the user encounters an Avatar associated with the same user, the virtual environment server or virtual environment client may generate the note icon for that user.

FIG. 4 shows another aspect which may be used to show information about the virtual environment. Specifically, in the lower right hand corner, a map 50 of the entire virtual environment or a portion of the virtual environment has been drawn. In this embodiment, every Avatar has been represented by a circle, and those that are seeking jobs are represented by filled circles. By looking at the map, the user may determine where the Avatars are concentrated in the virtual environment, and may also determine where the jobseekers are concentrated. Although job seekers have been shown in this embodiment, the same type of map may be used to look for other user traits, such as to locate concentrations of female users of the virtual environment. Accordingly, the map may be used for many purposes and may be used by the user to search for other users with common interests.

The map may be an inset map, may be included as part of the user interface, may be a popup, included in a web browser associated with the virtual environment, or provided to the user in another manner. The map may be grayscale, as shown, to show a particular feature of the users. Alternatively, the map may be color coded in which different colors are used to represent different traits and intensity or luminance values are used to provide additional information as well. The shape and size of the dots representing the users in the map may be adjusted as well to convey additional information. Many different ways of conveying information on the map may be implemented depending on the particular embodiment.

In the embodiment shown in FIG. 4, the map has been provided with a menu bar via which the user may toggle the type of information that is shown within the map. As the user selects a different aspect, the dots representing the users will change to show which users match the selected criteria. For example, in the menu shown in FIG. 4 the user is provided with four options. Specifically, the user may be used to highlight female users, male users, people that the user has already met and has notes on, and users that are looking for a job. Other criteria may be used as well and may be selected by the user. For example, the user may be provided with a drop-down menu of options rather than a menu bar that the user may use to select a particular interest or combination of interests. The interest or combination of interests may be used to highlight the users that have those particular qualities, and show where, within the virtual environment, those users are located. Selection of a particular interest or combination of interests may be implemented by clicking (for a single interest selection) or shift-clicking for a combination of interest selections. Other keystroke combinations and/or mouse/keystroke combinations may be used as well.

The user may use this tool to look for particular users and then navigate their Avatar toward the located Avatars in the virtual environment. By mousing over the small dot, the user may cause profile information about selected Avatars to be obtained which may allow the user to use their own experience to further select users for targeting within the virtual environment. When the Avatars that match the filtering criteria come within eyesight of the Avatar, those Avatars will be highlighted using appropriate interest icons or by causing the Avatars to be otherwise highlighted with respect to the other Avatars in the environment.

Figure 5:
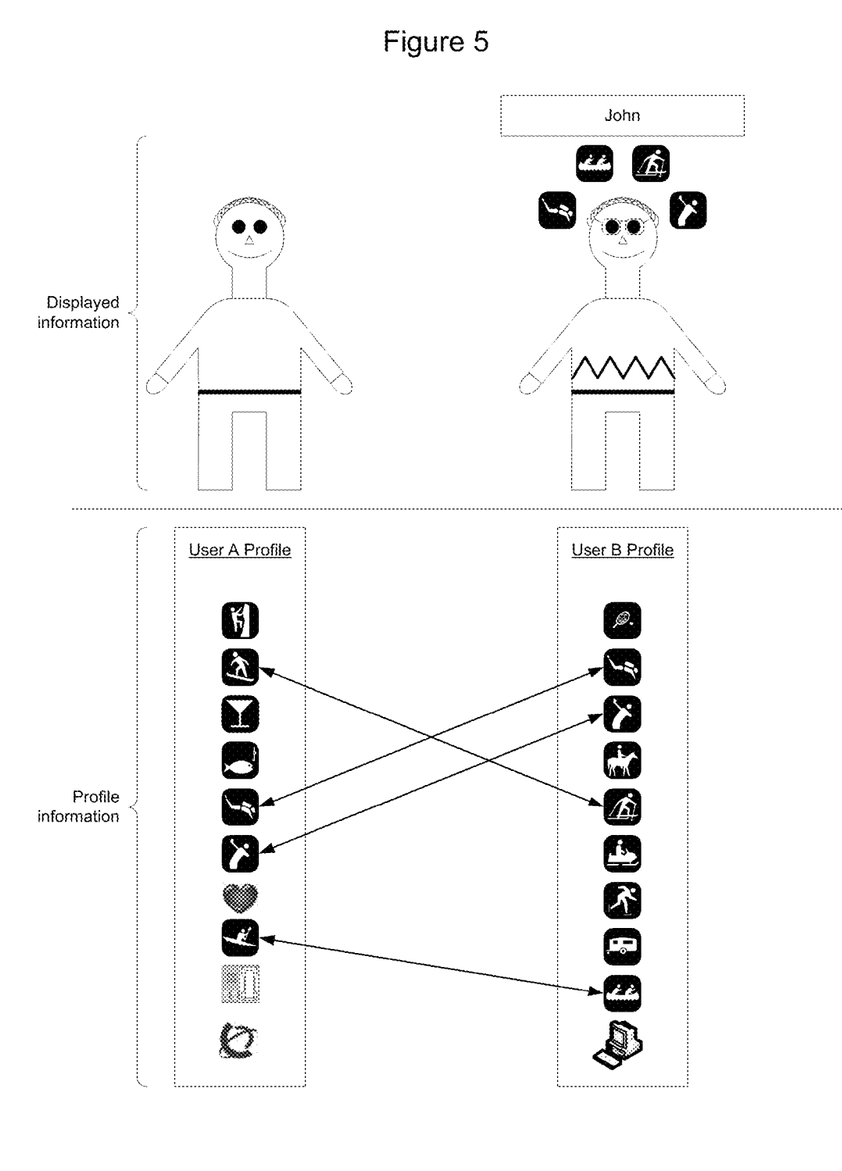
FIG. 5 shows an example of how user interests may be provided to a user of a computer-generated virtual environment when the user's Avatar encounters another Avatar in the computer-generated virtual environment according to an embodiment of the invention.

FIG. 5 shows an example of how interest matching may be implemented when two Avatars encounter each other in the virtual environment. As shown in FIG. 5, when a first Avatar associated with user A meets another Avatar associated with user B, the virtual environment interest matching engine will pull the profiles of each of the users and look for matching interests. The match may be exact where each of the users has expressed an interest in the same activity. In the illustrated example, both users have expressed an interest in diving and golf. Thus, the virtual environment matching engine may determine that there are common interests.

The match may also be based on categories of interests rather than exact matching. For example, a category of snowsports may include cross country skiing, alpine skiing, snowmobiling, and snowshoeing. Watersports may include kayaking, canoeing, swimming, diving, etc. There are numerous ways that categories may be selected. The virtual environment interest matching engine may thus pull possible interest matches by looking for related but not exact interest overlap. The virtual environment server will then generate an aura of interest indicators adjacent the Avatar that the user has met in the virtual environment. A similar set of icons would be shown to the other user as well.

The virtual environment interest matching engine may be set up in advance with the categories of similar interests, or may learn similarities over time. As users interact with each other in the virtual environment, the virtual environment interest matching engine may monitor users that interact with each other and compare interest profiles to learn what profile attributes tend to go together. Over time the interest matching engine may learn pairings and use the learned pairing information to select interest indicators for display. As an example, the interest matching engine may learn that people interested in bungee jumping may like to talk with people interested in rock climbing and other extreme sports.

Users of virtual environments may have diverse backgrounds and very different interests. Enabling each user to create their own categories of interests would likely result in the same interest being described in many different ways. For example, users may use the terms "bicycling", "biking", "riding", and "biking" to describe an interest in riding a bicycle. According to an embodiment of the invention, when a user creates an interest profile, the user is allowed to select from a list of defined entries. For example, the user may be presented with a set of categories and, within each category, a list of activities or other things that may be of interest and relevant to the category. The user may select from the predefined list of entries. By having all of the users select from the same list, the matching process may be implemented in a more straight-forward manner. Presenting the user with a list of options may also help the user since it is frequently easier to select options from a list than create a list in the first instance.

FIG. 6 shows several example interest icons that may be used in a computer-generated virtual environment. The icons shown in FIG. 6 are simply examples that were created for the purpose of explaining how the concepts may be implemented in a particular example virtual environment. The actual icons selected would be up to the designer of the virtual environment and thus the actual interest indicators used in an actual virtual environment may vary significantly from those depicted in FIG. 6.

Figure 7:
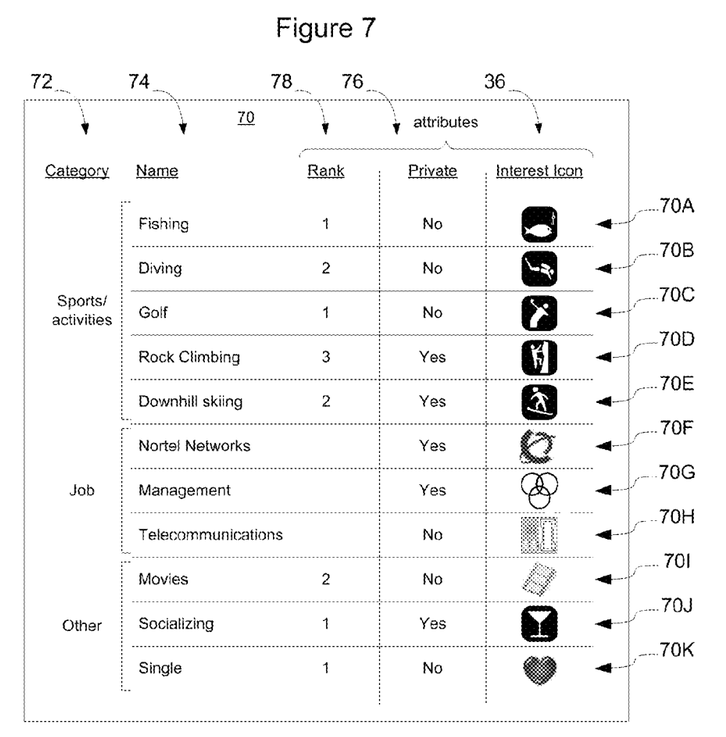
FIG. 7 shows an example user profile that may be created by/for a user of a computer-generated virtual environment according to an embodiment of the invention.

FIG. 7 shows an example profile that may be created by a user. As shown in FIG. 7, the user profile may contain entries 70A-70K for each interest that the user has elected to include in his profile. The entries may be grouped into categories 72. For example, as noted above, particular categories and sub-categories may be created such that particular activities are grouped within a category or sub-category. These categories may then be used to find users with similar, albeit not identical, interests.

In the example shown in FIG. 7, the user is able to create their profile from direct entry into an appropriate user interface. The profile may be more extensive than that, however, and may link for example with other profiles associated with the user. For example, social networking sites such as LinkdIn™ have recently become available. A user of a networking site such as this example networking site will generally have a profile. The profile enables the networking site to build a network for the user that may be used by the user to find people with similar educational backgrounds, work backgrounds, etc. In one embodiment, the profile may integrate with or pull information from other profiles that may have been created by/for the user to enable additional information to be provided to the user. For example, if the profile were to link to the user's LinkdIn profile, and the user encountered an Avatar that represented someone who was in the user's LinkdIn network, an Icon may be provided to notify the user and optionally explain the real-world connection to the user.

In the embodiment shown in FIG. 7, each entry includes both the name of the activity 74 and attributes 76. For example, one of the attributes may be the interest icon 36 used by the virtual environment as the interest indicator for that activity. This enables the user, when looking at their profile, to verify that the correct interest is listed and learn which icon is associated with that particular interest.

Each entry also contains an indication as to whether the user would like the interest to be private or public 78. Designating an entry as public enables an interest icon to be shown to other users of the virtual environment without further action by the user. Designating an entry as private, by contrast, prevents an interest icon to be shown to other users of the virtual environment until further action is taken by the user. For example, the user may keep all interest icons private and allow the interest icons to be shown only to known individuals such as colleagues, friends, or family. The user may also allow the interest icons to be shown on demand upon request from other users, for example while the user is interacting in the virtual environment. Other embodiments may allow other forms of control over the interest icons, to enable the user to control the type of information that is made available and to maintain other information as private or semi-private in the virtual environment.

Optionally, the user may also rank their interests 80 to indicate a level of interest in a particular activity. For example, a user may be a casual golfer and an avid bicyclist. The user thus may rank bicycling higher than golfing. The virtual environment interest matching engine may use the rank information 80 to find strong matches and weaker matches between users. Where there is a particularly strong match, the interest indicator may blink, change color, or otherwise highlight the fact that both users have expressed a strong interest in a particular activity. The rank may be on any scale, such as 1 to 5, 1 to 10, or any other desired scale. The interests may be ranked on an absolute or relative scale.

Figure 8:
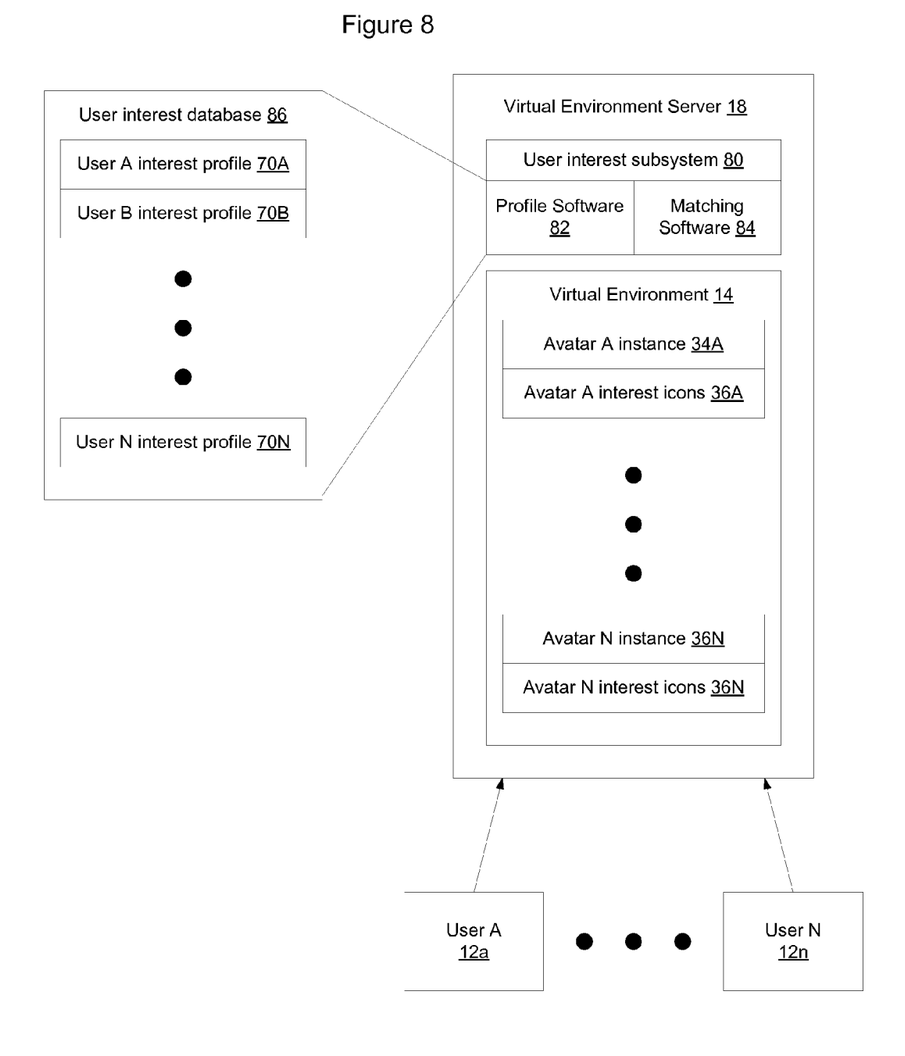
FIG. 8 is a functional block diagram showing components of the system of FIG. 1 interacting to enable visual indication of user interest to be provided to users of a computer-generated virtual environment according to an embodiment of the invention.

FIG. 8 shows a system that may be used to provide a visual indication of users interests within a computer-generated virtual environment according to an embodiment of the invention. As shown in FIG. 8, users 12 are provided with access to a virtual environment 14 that is implemented using one or more virtual environment servers 18. The virtual environment server in connection with virtual environment clients on the user computers (see FIG. 1) enables each user to see a portion of the virtual environment, depending on the location of the user's Avatar 34 within the virtual environment. In the example shown in FIG. 8, the virtual environment 14 includes Avatar instances 34A-34N for each user 12A-12N. In this embodiment, each user 12A-12N has a respective profile 70A-70N. The invention is not limited in this manner, as a subset of the users (rather than all of the users) may have profiles if desired.

The virtual environment server alone, or in combination with the virtual environment clients, will also cause visual indications of user interest 36A-N to be provided within the virtual environment. The visual indications may be interest icons or may take other forms. The visual indicators enable the users to learn the interests of the users represented 12A-12N by the Avatars 34A-34N. As discussed above in connection with FIG. 2, the system may enable each user 12A-12N to select one or more interest indicators to be seen by other users of the virtual environment. Alternatively, the system may enable each user to select which icons should be shown for each of the other users, as discussed above in connection with FIGS. 3 and 4. This may be done, for example, by specifying that particular icons should be shown so that, if another user has included the interest in their profile, the interest icon will be associated with their Avatar and visible to the user (FIG. 4). Alternatively, the user's profile may be used to provide an indication of which other users are interested in similar things (FIG. 3). Many different ways of generating interest icons may be implemented.

In the embodiment shown in FIG. 8, the virtual environment server has a user interest subsystem 80 that includes profile software 82 and matching software 84. The profile software 82 enables users to create interest profiles such as the profile shown in FIG. 7. The matching software 84 uses the information from the profiles to select particular interest icons for display to the users. User profiles may be stored in a user interest database 86. Alternatively, each user may store their profile on their computer and the profile interest information may be accessible to the profile software via the virtual environment clients 24.

Although particular modules have been described in connection with FIG. 8 as performing various tasks associated with providing visual indication of audio context, the invention is not limited to this particular embodiment as many different ways of allocation functionality between components of a computer system may be implemented. Additionally, the manner in which the functionality is split between the virtual environment server and the virtual environment client may be adjusted as well. For example, depending on the sophistication of the client, more of the responsibility for rendering the Avatars and interest icons may be placed on the virtual environment client rather than on the virtual environment server. Thus, the particular implementation will depend on the particular programming techniques and software architecture selected for its implementation and the invention is not intended to be limited to the one illustrated architecture.

The functions described above may be implemented as one or more sets of program instructions that are stored in a computer readable memory and executed on one or more processors within on one or more computers. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a memory chip, computer memory, memory stick, disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of providing dynamically selected interest information in a computer-generated virtual environment, the method comprising the steps of:

establishing a first user interest profile for a first user of the computer-generated virtual environment, the first user interest profile specifying a first set of interests of the first user of the computer-generated virtual environment;

establishing a second user interest profile for a second user of the computer-generated virtual environment, the second user interest profile specifying a second set of interests of the second user of the computer-generated virtual environment;

receiving input, by a first user virtual environment client, from the first user defining the dynamically selected interest information of the first user while a first Avatar associated with the first user is interacting with other Avatars in the computer-generated virtual environment, the dynamic selected interest information identifying a subset of interests of the first set of interests of the first user in the first user interest profile;

upon encountering a second Avatar associated with the second user by the first Avatar associated with the first user, obtaining by the first user virtual environment client, the second set of interests of the second user from the second user interest profile;

filtering, by the first user virtual environment client, the obtained second set of interests of the second user based on the first set of interests of the first user and the dynamic selected interest information to identify a subset of the second set of interests of the second user from the second user interest profile that match the dynamic selected interest information; and generating, by the first user virtual environment client, a set of interest icons representing the identified subset of the second set of interests of the second user for display to the user in association with the second Avatar associated with the second user of the computer-generated virtual environment;

wherein the set of interest icons generated for display to the first user in association with the second Avatar are selected individually for the first user and are not provided to other users of the computer-generated virtual environment.

2. The method of claim 1, wherein the first user profile information includes the first user's interest, job function, and location.

3. The method of claim 1, wherein the set of interest icons are graphical icons.

4. The method of claim 1, wherein the set of interest icons include text.

5. The method of claim 1, wherein at least one of the interest icons of the set of interest icons includes a corporate badge.

6. The method of claim 5, wherein the corporate badge includes authentication state information to indicate whether the second user was authenticated when entering the computer-generated virtual environment.

7. The method of claim 1, wherein the interest icons are displayed around the second Avatar associated with the second user and are visible only to the first user.

8. The method of claim 1, further comprising the step of enabling the user to designate a portion of the second user interest profile as private, and wherein the step of obtaining will not obtain the portion of the second user interest profile that has been designated as private.

9. The method of claim 1, wherein the step of filtering is inherent.

10. The method of claim 9, wherein the step of filtering requires the information to match exactly.

11. The method of claim 9, wherein the step of filtering enables a match to occur based on similarities between information other than an exact match.

12. The method of claim 11, wherein the step of filtering is based on learned similarities.

13. The method of claim 1, further comprising the step of:
defining a map showing concentrations of users with interest profiles containing the dynamically selected interest information, the map being implemented as a two dimensional plan view representation of the computer-generated virtual environment.

14. The method of claim 13, wherein the step of receiving input is implemented in connection with interaction between the first user and the map.

15. The method of claim 1, wherein at least one of the interest icons indicates that the user has created a note about the other user associated with the Avatar.

16. The method of claim 15, further comprising the step of enabling the first user to retrieve the note by mousing over the note icon to quickly recall information about the other user.

* * * * *